(12) United States Patent
Lin

(10) Patent No.: US 8,297,852 B2
(45) Date of Patent: Oct. 30, 2012

(54) OPTICAL FIBER COUPLING ASSEMBLY AND OPTICAL TRANSMITTING DEVICE HAVING SAME

(75) Inventor: I-Thun Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 330 days.

(21) Appl. No.: 12/783,564

(22) Filed: May 20, 2010

(65) Prior Publication Data

US 2011/0158589 A1 Jun. 30, 2011

(30) Foreign Application Priority Data

Dec. 31, 2009 (TW) ................................ 98146143 A

(51) Int. Cl.
*G02B 6/38* (2006.01)
(52) U.S. Cl. ................ 385/74; 385/83; 385/65; 385/33; 385/35
(58) Field of Classification Search .................... None
See application file for complete search history.

(56) References Cited

U.S. PATENT DOCUMENTS

| 4,119,362 A * | 10/1978 | Holzman ......................... 385/74 |
| 4,420,219 A * | 12/1983 | Muchel ........................... 385/74 |
| 6,870,990 B2 * | 3/2005 | Uekawa .......................... 385/49 |
| 2002/0090173 A1 * | 7/2002 | Kittaka et al. ................... 385/34 |
| 2006/0193565 A1 * | 8/2006 | Sasaki et al. .................... 385/65 |

* cited by examiner

*Primary Examiner* — Hemang Sanghavi
(74) *Attorney, Agent, or Firm* — Altis Law Group, Inc.

(57) ABSTRACT

An exemplary optical fiber coupling assembly includes a first optical connector, a second optical connector, and a coupling lens. The first optical connector is configured for receiving a first optical fiber. The second optical connector is configured for receiving a second optical fiber. The coupling lens is positioned in the second optical connector. The coupling lens includes a first optical portion and a second optical portion integrally formed with the first optical portion. The coupling lens is configured for transmitting optical signals between the first optical fiber and the second optical fiber through the first optical portion and the second optical portion.

20 Claims, 5 Drawing Sheets

OPTICAL FIBER COUPLING ASSEMBLY AND OPTICAL TRANSMITTING DEVICE HAVING SAME

BACKGROUND

1. Technical Field

The present disclosure relates to optical fiber coupling assemblies and optical transmitting devices having the same.

2. Description of Related Art

An optical transmitting device typically includes an optical fiber coupling assembly and optical fibers. The optical fiber coupling assembly includes two optical fiber coupling connectors, such as a male connector and a female connector, for coupling the optical fibers together to allow optical transmittance between the optical fibers. The connectors include lenses each being aligned with a corresponding optical fiber. When coupling connectors together, a lens in the male connector has to be precisely aligned with a corresponding lens in the female connector to ensure optical transmittance. However, the alignment of lenses is generally difficult to achieve, which may result in poor optical transmittance.

Therefore, an optical fiber coupling assembly and an optical transmitting device having the same, which can overcome the above-mentioned problems, are needed.

DETAILED DESCRIPTION

Figure 1:
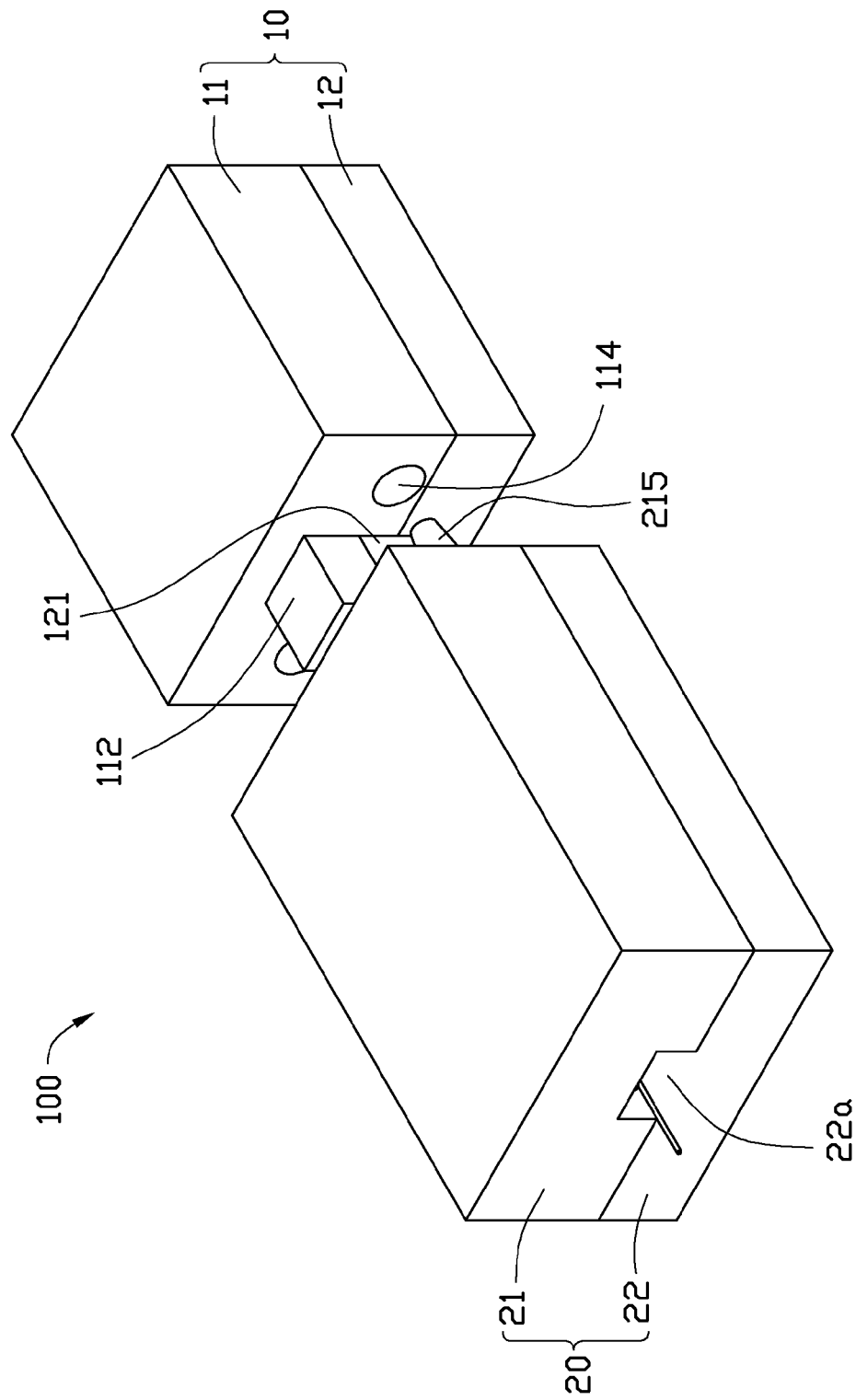
FIG. 1 is an isometric and schematic view of an optical transmitting device, according to an exemplary embodiment, showing the optical transmitting device in an uncoupled state.
Figure 2:
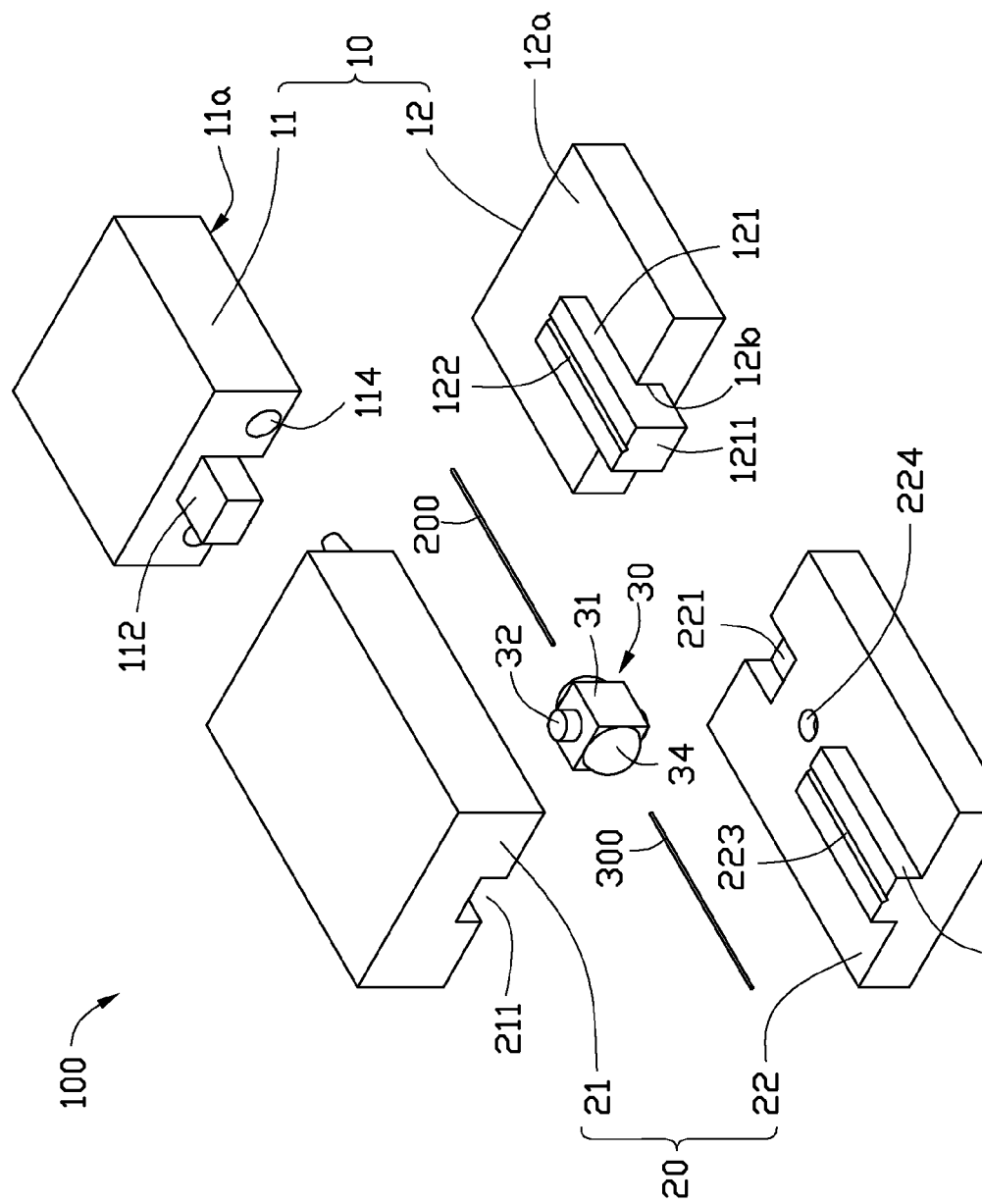
FIG. 2 is a disassembled view of the optical transmitting device of FIG. 1.

Referring to FIGS. 1 and 2, an optical transmitting device 100, according to an exemplary embodiment, includes an optical fiber coupling assembly and two optical fibers 200, 300 (hereinafter a first optical fiber 200 and a second optical fiber 300). The coupling assembly includes a first optical connector 10, a second optical connector 20, and a unitary coupling lens 30. The first optical connector 10 is mechanically engaged with the second optical connector 20 when the optical transmitting device 100 is in a coupled state.

The first optical connector 10 is configured for receiving the first optical fiber 200 and includes a first upper cover 11, a first lower cover 12, a first fixing portion 112, and a second fixing portion 121.

Figure 3:
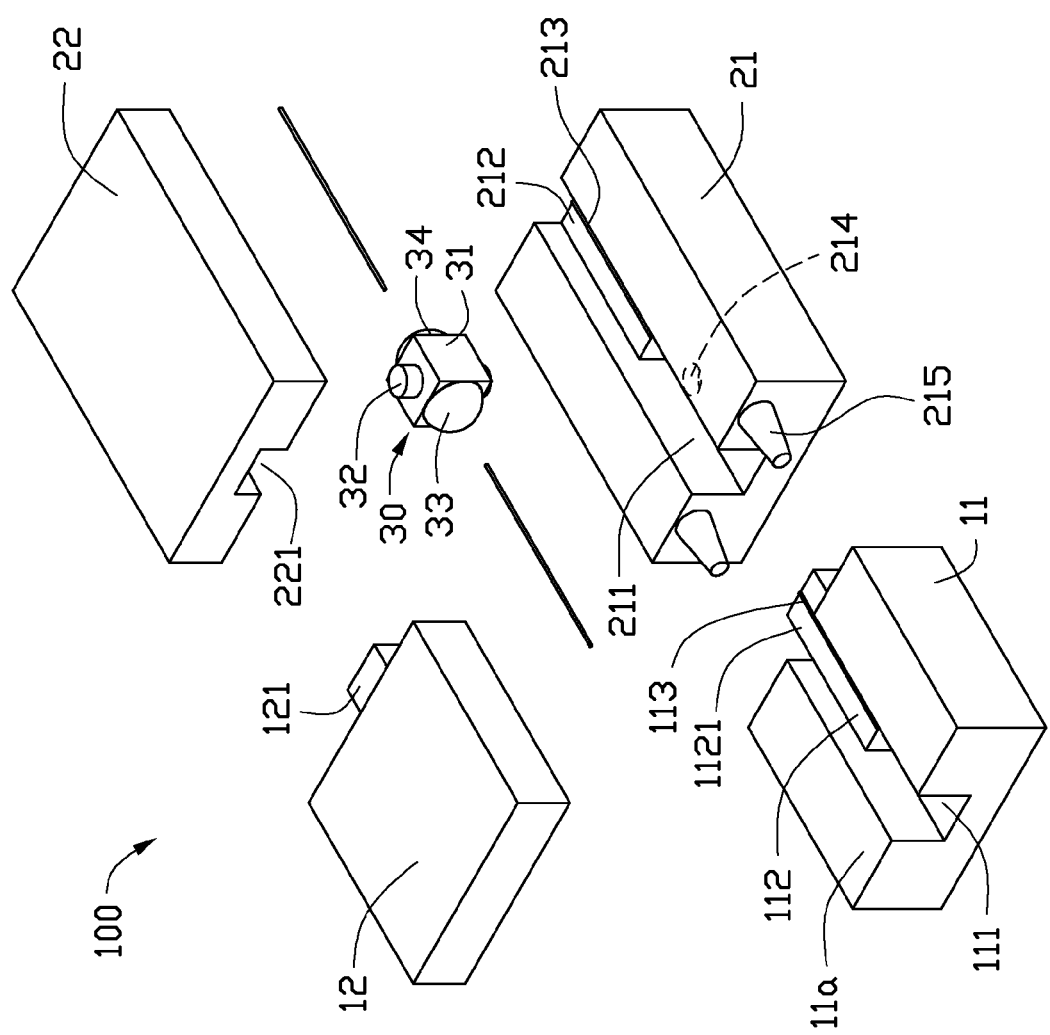
FIG. 3 is similar to FIG. 2, but viewing the optical transmitting device from another angle.
Figure 4:
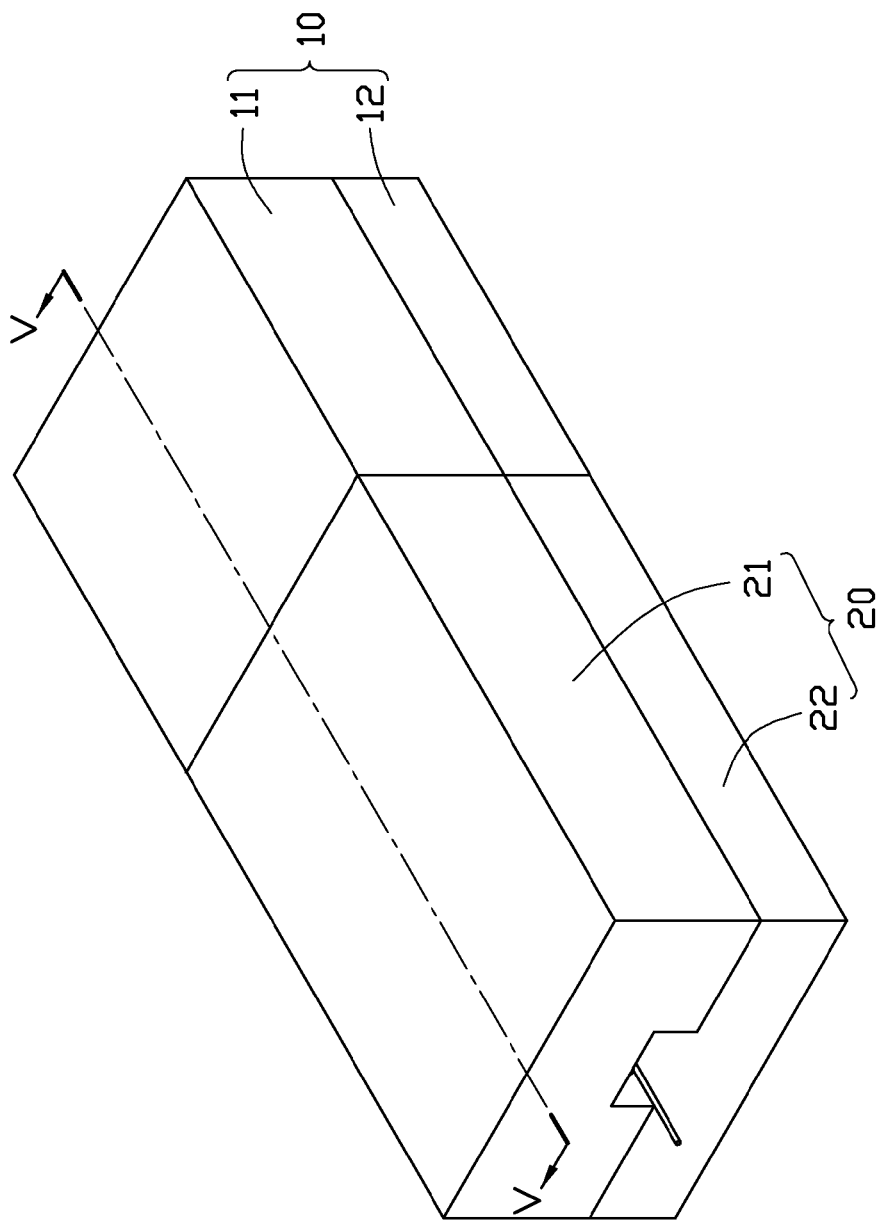
FIG. 4 is similar to FIG. 1, but showing the optical transmitting device in a coupled state.

Further referring to FIG. 3, the first upper cover 11 defines a first groove 111 in a surface 11a of the first upper cover 11 facing the first lower cover 12. The first fixing portion 112 is fixedly and partially received in the first groove 111. A first coupling end 1121 of the first fixing portion 112 protrudes from the first upper cover 11. The first fixing portion 112 defines a first sub groove 113 (see FIG. 3) in a surface of the first fixing portion 112 in contact with the second fixing portion 121. Two first positioning holes 114 are defined in an end surface of the first upper cover 11 facing the second optical connector 20. The first coupling end 1121 is between the two first positioning holes 114.

The first lower cover 12 defines a second groove 12b in a surface 12a of the first lower cover 12. The surface 11a of the first upper cover 11 faces the surface 12a of the first lower cover 12. The second groove 12b corresponds to the first groove 111. The second fixing portion 121 is fixedly and partially received in the second groove 12b. A second coupling end 1211 of the second fixing portion 121 protrudes from the first lower cover 12. The second fixing portion 121 defines a second sub groove 122 (see FIG. 2) in a surface of the second fixing portion 121 in contact with the first fixing portion 112.

Figure 5:
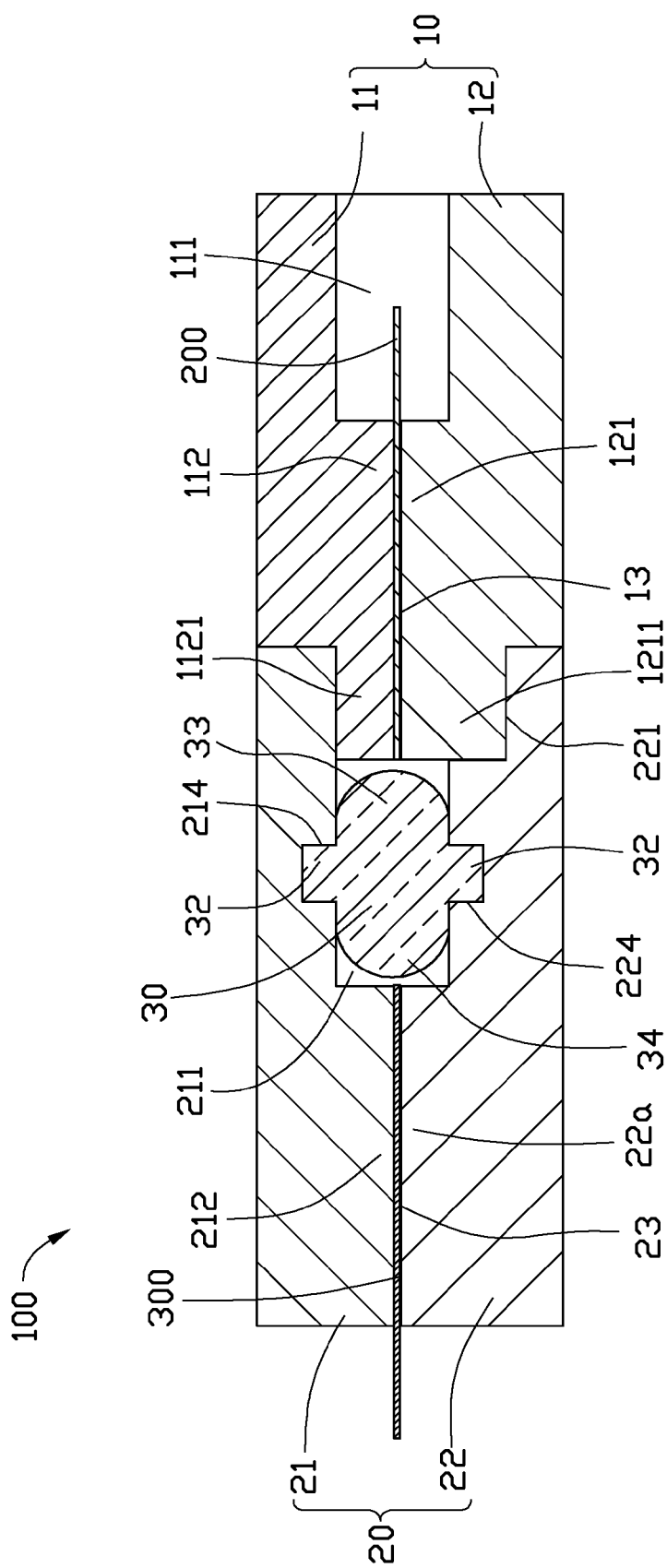
FIG. 5 is a sectional view taken along line V-V of the optical transmitting device of FIG. 4.

When the first upper cover 11 and the first lower cover 12 are assembled together, the first sub groove 113 and the second sub groove 122 cooperatively form a first fixing hole 13 (see FIG. 5). The first optical fiber 200 is fixedly received in the first fixing hole 13.

The second optical connector 20 is configured for receiving the second optical fiber 300 and includes a second upper cover 21, a second lower cover 22, a third fixing portion 212, and a fourth fixing portion 22a.

The second upper cover 21 defines a third groove 211, and a second positioning hole 214 in a surface thereof facing the second lower cover 22. The third groove 211 is aligned with the first groove 111. The third groove 211 and the second positioning hole 214 are arranged in order from the second lower cover 22 to the second upper cover 21. Two first positioning posts 215 extend from an end surface of the second upper cover 21 facing the first upper cover 11. Each first positioning post 215 is aligned with and is inserted into a corresponding first positioning hole 114 when the first optical connector 10 is coupled to the second optical connector 20.

The third fixing portion 212 is fixedly received in the third groove 211. In this embodiment, the third fixing portion 212 is integrally formed with the second upper cover 21. The third fixing portion 212 is spaced from the second positioning hole 214 so that the second positioning hole 214 is exposed from the third groove 211. The second positioning hole 214 and the third fixing portion 212 are arranged in order away from the first positioning post 215 (see FIG. 3). The third fixing portion 212 defines a third sub groove 213 in a surface of the third fixing portion 212 in contact with the fourth fixing portion 22a.

The second lower cover 22 defines a fourth groove 221 and a third positioning hole 224 in a surface thereof facing the second upper cover 21. The fourth groove 221 is aligned with the second groove 12b and corresponds to the third groove 211.

The fourth fixing portion 22a is formed on the surface of the second lower cover 22 facing the second upper cover 21. The fourth fixing portion 22a is received in the third groove 211 when the second upper cover 21 and the second lower cover 22 are assembled together. In this embodiment, the fourth fixing portion 22a is integrally formed with the second lower cover 22. The fourth fixing portion 22a defines a fourth sub groove 223 in a surface of the fourth fixing portion 22a in contact with the third fixing portion 212. The third positioning hole 224 is arranged between the fourth groove 221 and the fourth fixing portion 22a.

The coupling lens 30 is formed as an integrated structure and may be made by an injection molding process. The coupling lens 30 includes a body 31, two second positioning posts 32, and two optical portions 33, 34 (hereinafter a first optical portion 33 and a second optical portion 34). The first optical portion 33 is optically coupled to the first optical fiber 200. The second optical portion 34 is optically coupled to the second optical fiber 300.

The body 31 is substantially cuboid. The body 31 is slightly narrower than the third groove 211 so that the body 31 can be fittingly received in the third groove 211. The two second positioning posts 32 extend from two outer surfaces of the body 31 facing the respective positioning holes 214, 224. When the body 31 is received in the third groove 211, the two second positioning posts 32 are fitly received in the second and third positioning holes 214, 224, respectively to position the coupling lens 30 in front of the third fixing portion 212.

The two optical portions 33, 34 are integrally formed on other two outer surfaces of the body 31. In this embodiment, the optical portions 33, 34 are convex portions with aspherical outer surfaces. The coupling lens 30 and the optical portions 33, 34 are coaxial.

When the second upper cover 21 and the second lower cover 22 are assembled together, the third sub groove 213 and the fourth sub groove 223 cooperatively form a second fixing hole 23 (see FIG. 5). The second optical fiber 300 is fixedly received in the second fixing hole 23. The coupling lens 30 is positioned in the second optical connector 20 by the second positioning posts 32 and positioning holes 214, 224. The second optical portion 34 of the coupling lens 30 faces a distal end of the second optical fiber 300.

During coupling the connectors 10, 20, the first optical connector 10 and the second optical connector 20 can be guided by the first positioning posts 215 and the first positioning holes 114. The first coupling end 1121 is received in the third groove 211, and the second coupling end 1211 is received in the fourth groove 221, thereby positioning the first optical fiber 200 facing and aligned with the first optical portion 33 of the coupling lens 30.

Since the optical portions 33, 34 of the coupling lens 30 are integrally formed, precise alignment of the optical portions 33, 34 can be achieved when making the coupling lens 30. This increases optical transmittance ratio of the optical transmitting device 100.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optical fiber coupling assembly, comprising:
    a first optical connector configured for receiving a first optical fiber, the first optical connector comprising:
        a first upper cover defining a first groove in a surface of the first upper cover;
        a first lower cover mounted to the first upper cover, and the first groove facing the first lower cover;
        a first fixing portion fixedly and partially received in the first groove; and
        a second fixing portion fixed to the first lower cover and in contact with the first fixing portion; and thus the second fixing portion and the first fixing portion cooperatively defining a first fixing hole for fixedly receiving the first optical fiber;
    a second optical connector configured for receiving a second optical fiber, the first optical connector mechanically engaged with the second optical connector; and
    a unitary coupling lens positioned within the second optical connector, the coupling lens comprising a first optical portion optically coupled to the first optical fiber and a second optical portion optically coupled to the second optical fiber, the second optical portion integrally formed with the first optical portion.

2. The optical fiber coupling assembly of claim 1, wherein the first lower cover defines a second groove in a surface of the first lower cover facing the first upper cover, the second fixing portion being fixedly and partially received in the second groove.

3. The optical fiber coupling assembly of claim 1, wherein the first fixing portion defines a first sub groove in a surface of the first fixing portion in contact with the second fixing portion, and the second fixing portion defines a second sub groove in a surface of the second fixing portion in contact with the first fixing portion, the first sub groove and the second sub groove cooperatively form the first fixing hole.

4. The optical fiber coupling assembly of claim 1, wherein the first fixing portion comprises a first coupling end protruding from the first upper cover, and the second fixing portion comprises a second coupling end protruding from the first lower cover.

5. The optical fiber coupling assembly of claim 4, wherein the first optical connector defines two first positioning holes in an end surface of the first upper cover facing the second optical connector, and the first coupling end is between the two first positioning holes.

6. The optical fiber coupling assembly of claim 5, wherein the second optical connector comprises two first positioning posts corresponding to the first positioning holes, and the first positioning post is inserted into a corresponding first positioning hole when the first optical connector is coupled to the second optical connector.

7. The optical fiber coupling assembly of claim 1, wherein the second optical connector comprises a second upper cover, a second lower cover mounted to the second upper cover, a third fixing portion, and a fourth fixing portion, the third fixing portion fixed to the second upper cover, the fourth fixing portion fixed to the second lower cover and in contact with the third fixing portion, the third fixing portion and the fourth fixing portion cooperatively defining a second fixing hole for fixedly receiving the second optical fiber.

8. The optical fiber coupling assembly of claim 7, wherein the second upper cover defines a third groove in a surface of the second upper cover facing the second lower cover, the third fixing portion being fixedly received in the third groove.

9. The optical fiber coupling assembly of claim 8, wherein the fourth fixing portion is integrally formed with the second lower cover and received in the third groove.

10. The optical fiber coupling assembly of claim 7, wherein the third fixing portion defines a third sub groove in a surface of the third fixing portion in contact with the fourth fixing portion, and the fourth fixing portion defines a fourth sub groove in a surface of the fourth fixing portion in contact with the third fixing portion, the third sub groove and the fourth sub groove cooperatively form the second fixing hole.

11. The optical fiber coupling assembly of claim 7, wherein the second upper cover defines a second positioning hole in a surface of the second upper cover in contact with the second lower cover, and the second lower cover defines a third positioning hole in a surface of the second lower cover in contact with the second upper cover, the second positioning hole is aligned with the third positioning hole.

12. The optical fiber coupling assembly of claim 11, wherein the coupling lens further comprises a body, and two second positioning posts extending from two outer faces of the body and fittingly received in the second positioning hole and the third positioning hole, respectively to position the couple lens in the second optical connector, the first and second optical portions being integrally formed on other two outer surfaces of the body.

13. An optical transmitting device, comprising:
a first optical fiber, a second optical fiber aligned with the first optical fiber; and an optical fiber coupling assembly, the optical fiber coupling assembly comprising:
a first optical connector configured for receiving the first optical fiber, the first optical connector comprising:
a first upper cover defining a first groove in a surface of the first upper cover;
a first lower cover mounted to the first upper cover, and the first groove facing the first lower cover;
a first fixing portion fixedly and partially received in the first groove; and
a second fixing portion fixed to the first lower cover and in contact with the first fixing portion; and thus the second fixing portion and the first fixing portion cooperatively defining a first fixing hole for fixedly receiving the first optical fiber;
a second optical connector configured for receiving the second optical fiber, the first optical connector mechanically engaged with the second optical connector; and
a unitary coupling lens positioned between the first optical fiber and the second optical fiber, the coupling lens comprising a first optical portion optically coupled to the first optical fiber and a second optical portion optically coupled to the second optical fiber, the second optical portion integrally formed with the first optical portion.

14. The optical transmitting device of claim 13, wherein the first lower cover defines a second groove in a surface of the first lower cover facing the first upper cover, the second fixing portion being fixedly and partially received in the second groove.

15. The optical transmitting device of claim 13, wherein the first fixing portion comprises a first coupling end protruding from the first upper cover, and the second fixing portion comprises a second coupling end protruding from the first lower cover.

16. The optical transmitting device of claim 15, wherein the first optical connector defines two first positioning holes in an end surface of the first upper cover facing the second optical connector, and the first coupling end is between the two first positioning holes.

17. The optical transmitting device of claim 16, wherein the second optical connector comprises two first positioning posts corresponding to the first positioning holes, and the first positioning post is inserted into a corresponding first positioning hole when the first optical connector is coupled to the second optical connector.

18. The optical transmitting device of claim 16, wherein the second optical connector comprises a second upper cover, a second lower cover mounted to the second upper cover, a third fixing portion, and a fourth fixing portion, the third fixing portion fixed to the second upper cover, the fourth fixing portion fixed to the second lower cover and in contact with the third fixing portion, the third fixing portion and the fourth fixing portion cooperatively defining a second fixing hole for fixedly receiving the second optical fiber.

19. The optical transmitting device of claim 18, wherein the second upper cover defines a third groove in a surface of the second upper cover facing the second lower cover, the third fixing portion being fixedly received in the third groove.

20. The optical transmitting device of claim 19, wherein the fourth fixing portion is integrally formed with the second lower cover and received in the third groove.

* * * * *